Figure 1:
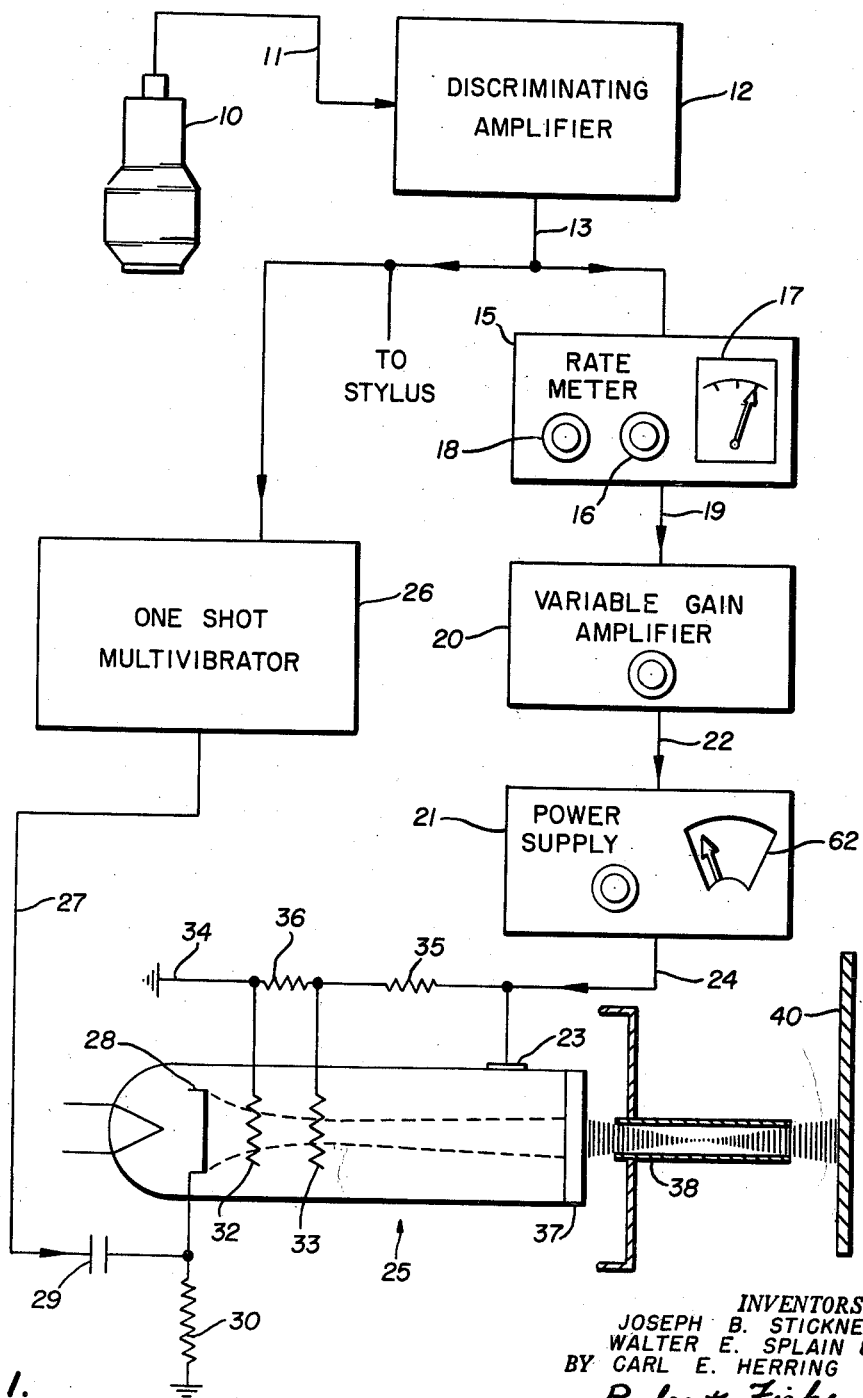

United States Patent Office 3,159,744
Patented Dec. 1, 1964

3,159,744
SCINTILLATION SCANNER PHOTO-CIRCUIT
Joseph B. Stickney, Rocky River, Ohio, Carl E. Herring, Ann Arbor, Mich., and Walter E. Splain, Fairview Park, Ohio, assignors to Picker X-Ray Corporation, Waite Manufacturing Division, Inc., Cleveland, Ohio, a corporation of Ohio
Continuation of application Ser. No. 820,508, June 15, 1959. This application Feb. 6, 1963, Ser. No. 257,373
29 Claims. (Cl. 250—71.5)

This is a continuation of application Serial No. 820,508 filed June 15, 1959.

This invention relates to scintillation scanning devices and more particularly to a photorecording system for producing a graphic presentation of the distribution and concentration of radioactivity in an area.

In a copending application for United States patent entitled "Scintillation Scanner," filed by Joseph B. Stickney, Clarence E. Lemmermann, Carl E. Herring, and Roland W. Carlson, filed June 1, 1959, and bearing the Serial Number 817,403, now U.S. Patent No. 3,070,695, which issued on December 25, 1962, a mechanism for conducting a scintillation study is disclosed. In that mechanism a scintillation probe is supported on a boom which reciprocates along a series of parallel rectilinear paths to cover a predetermined area. A light source and a stylus are also carried by the boom to reciprocate along paths of travel which parallel the probe path of travel. The light source and the stylus are electrically connected to the probe to simultaneously produce graphic images, on both a film and a sheet of paper, of the activity being measured.

The present invention is directed to the use of a cathode ray tube as a light source and a novel and improved system for transmitting impulses from the scintillation probe to the tube and emitting light pulses from the tube which are proportional in both frequency and brightness to the rate of activity detected by the probe.

With the present invention a discriminating type amplifier is connected to the scintillation probe. The amplifier is of the type which will emit impulses only when pulses within a preselected range of amplitude are fed into it. If a scintillation crystal such as thallium-activated sodium iodide is used in the probe, the pulses produced by the probe are proportional in amplitude to the quantum energy absorbed by the crystal. The discriminating amplifier selects pulses corresponding to a given range of quantum energies, while rejecting all other pulses.

A one-shot multivibrator is connected to the discriminating amplifier. The multivibrator emits one pulse of a predetermined time duration for each impulse received from the discriminating amplifier. The pulses emitted by the multivibrator are transmitted to the cathode of a cathode ray tube. With this construction, the cathode will emit one impulse for each count detected by the probe and passed by the amplifier.

A rate meter (or pulse frequency meter) and a variable amplifier are series connected to the discriminating amplifier. The rate meter and variable amplifier are each adjustable to provide appropriate output impulses which vary with the activity being studied. The variable amplifier controls a variable voltage power supply within a predetermined range. The power supply is connected to the accelerator electrode of the cathode ray tube. Since the output of the rate meter and the variable amplifier is proportional to the rate of radiation quantum detection by the probe, the voltage of the accelerator electrode is also proportional to the rate of detection or the count rate. For this reason the intensity of each flash of light emitted by the cathode ray tube will be proportional to the count rate.

Accordingly, one of the principal objects of this invention is to provide a novel and improved photorecording system responsive to radioactivity, which system has a light output which varies with the rate of activity detection.

A related object of the invention is to provide such a system in which the light pulse output varies both in frequency and intensity with the count rate.

Expressed another way, a principal object of the invention is to provide a novel and improved photorecording system in which the density of a produced photographic image may be proportional to a detected count rate, or in which the contrast of the image may be artificially enhanced.

As an example of the foregoing object, it is possible to so adjust the disclosed device that any selected minimum count rate will produce minimal density on the film, and simultaneously any selected maximum count rate will produce maximum useable density.

In prior proposals for some recording systems responsive to a measurement of radioactivity, it is common to record only a selected number of the counts, which selected number is often a power of two. For example, every other, or every fourth, or every eighth count may be measured. With the system of this invention all counts are measured so long as a selected minimal activity is exceeded.

Accordingly, another object of this invention is to provide a novel and improved photorecording system in which the image produced reflects each and every impulse emitted by the probe in response to detected activity.

Still another object of the invention is to provide a novel and improved photorecording system in which there is no time delay provided in the system so that the cathode ray tube emits a light pulse substantially instantaneously after the probe detects a measurable radioactive particle or ray.

Still another object of the invention is to provide a novel and improved photorecording system which is substantially infinitely adjustable.

Figure 2:
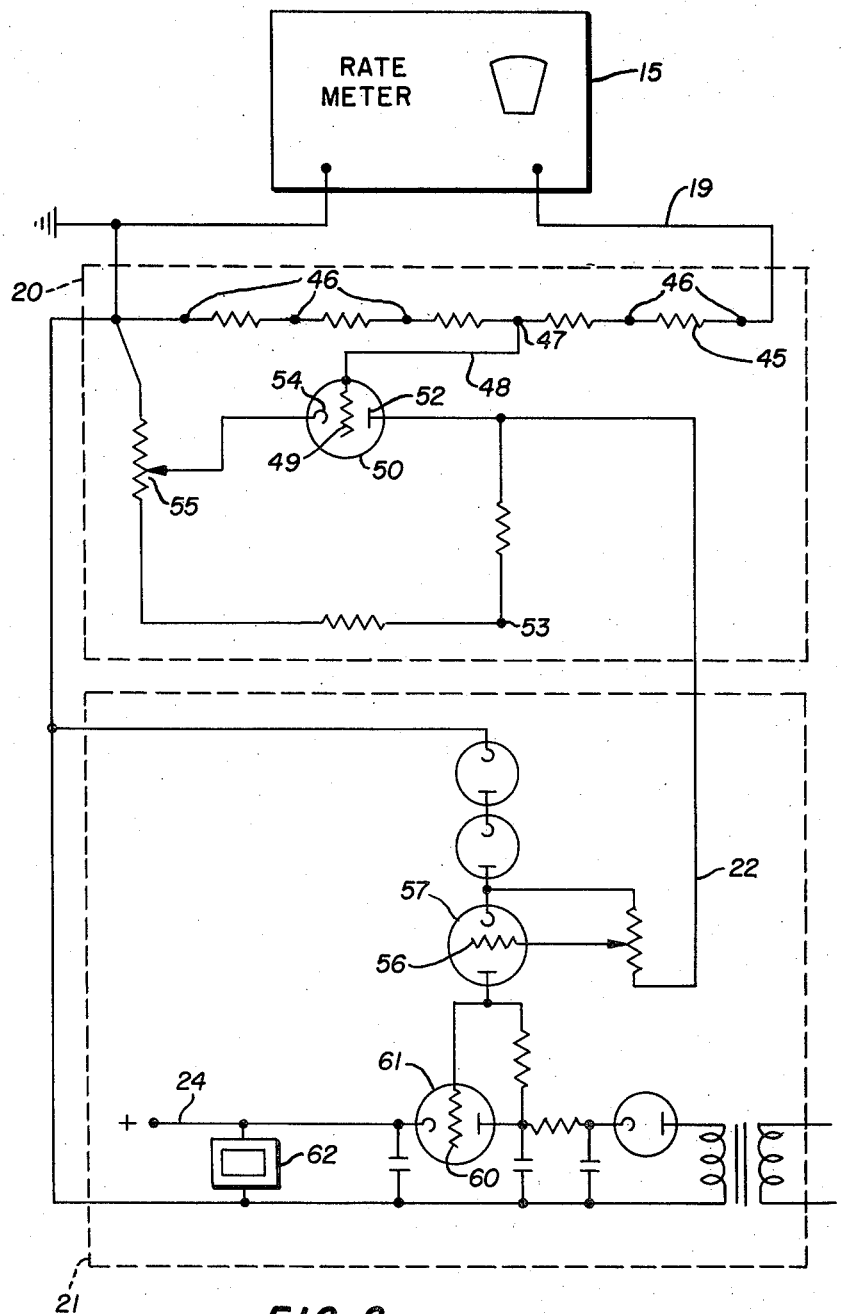

Other objects and a fuller understanding of the invention may be had by referring to the following description and claims, taken in conjunction with the accompanying drawing, in which:

FIGURE 1 is a schematic view of the novel and improved photorecording system; and, FIGURE 2 is a wiring diagram of the variable gain amplifier and the power supply.

Referring to the drawing, a scintillation probe is shown generally at 10. The probe 10 may take any of the usual and well known forms. These usual forms normally comprise a fluorescent crystal, a photoelectric tube, suitable circuitry to energize the tube and to transmit output impulses from the tube, and suitable heavy metal shielding and collimating means to render the probe sensitive to radiation from essentially only one direction. The output impulses are transmitted through a conductor 11 to a suitable discriminating amplifier 12.

The discriminating amplifier 12 includes any suitable amplifier circuit which has the characteristics of a single-channel differential discriminator, as described in "Electronics-Experimental Techniques," by W. C. Elmore and M. Sands, McGraw-Hill (1949), p. 228 ff. All counts are amplified and one amplified pulse is emitted through conductor 13 for each radioactive impulse detected by the probe 10 and falling within the selected pulse height range.

A rate meter 15 is connected to the conductor 13. The rate meter 15 is of the usual type which will indicate the count rate being detected. A range control 16 is provided for selecting an appropriate scale on meter dial 17. A time constant selector 18 is provided. The time constant is a length of time over which the count rate is measured to determine the rate. The longer the time constant, the more stable will be the reading on the dial 17. Preferably, a time constant range of from one-eighth to five seconds is provided. When the device is in operation, any change in the count rate will be reflected by the output of the ratemeter, but that reflection will lag by a length of time proportional to the time constant. A rate meter of the type described is currently sold by Picker X-Ray Corp., Waite Manufacturing Division, Inc., as Cat. 2805.

The output of the rate meter 15 is conducted by a conductor 19 to a variable gain, direct coupled amplifier 20. The output of the rate meter in the preferred and disclosed arrangement is between 0 and 7 volts D.C. at all times. With a selected study it may be known, for example, that the count rate will vary between 6 and 8 thousand counts per minute. The 10,000 count per minute scale on the rate meter will be selected and it will therefore be known that the output voltage of the rate meter will vary between 60 and 80 percent of the maximum 7 volts. With this example the output voltage will vary from 4.2 to 5.6 volts. This provides a voltage difference of 1.4 volts. With this example the variable amplifier 20 is adjusted so that it varies from minimum to maximum output with an input variation of 1.4 volts. Thus, in this example, the amplifier output will be at a minimal voltage when the input to the amplifier is 4.2 volts and at a maximum voltage when the input is 5.6 volts.

A power supply 21 is provided which preferably has an output of from 500 to 900 volts. A conductor 22 connects the variable amplifier 20 to the power supply 21. The varying output of the variable amplifier controls the power supply and causes its output to vary proportionally with the variable amplifier output and therefore with the probe count rate. One suitable power supply is shown in FIGURE 2, which will be described presently. Another is the type shown at page 365 of "Electronics-Experimental Techniques," while still another is that sold by Picker X-Ray Corp., Waite Manufacturing Division, Inc., as Cat. 2813.

The output of the power supply 21 is connected through a conductor 24 to an accelerating electrode 23. The accelerating electrode or ring forms a part of a cathode ray tube shown generally at 25. One suitable cathode ray tube is RCA type C73687A.

A one shot multivibrator 26 is also connected to the conductor 13. The multivibrator is of the type which will emit one impulse of a predetermined time duration and power for each pulse transmitted to it by the conductor 13. Preferably, the one shot multivibrator includes an adjustment to vary the time duration of the emitted pulses. The time duration may, for example, be from 1 to 100 microseconds. A suitable one shot multivibrator is disclosed at pages 88 through 91 of "Electronics-Experimental Techniques."

The one shot multivibrator 26 is connected through conductor 27 to cathode 28 of the cathode ray tube 25. A coupling condenser 29 is included in the conductor 27. The cathode 28 is grounded through a biasing resistor 30.

The cathode ray tube 25 includes a control grid 32 and an accelerating or focusing anode 33. The control grid 32 is connected to ground through a conductor 34. The focusing or accelerating anode 33 has its voltage supplied by a voltage divider 35 and 36 which is connected across the power supply 21.

The cathode ray tube 25 includes the usual target 37 in the form of a fluorescent screen. A collimator 38 focuses the emitted light to an appropriate sized dot for impingement on a photographic film 40.

Circuitry for a suitable variable gain amplifier 20 and for a suitable power supply 21 is shown in FIGURE 2. The conductor 19 connects the rate meter 15 to a resistor 45. A plurality of contacts 46 are provided at spaced locations along the resistor. A moveable contact 47 is connectable to a selected one of the contacts 46.

The appropriate one of the contacts 46 is selected by determining what percentage of the selected rate meter scale is represented by the difference between maximum and minimum count rate readings. If this percentage is, for example, 80 percent the moveable contact 47 is engaged with the contact 46 which will place 20 percent of the resistor between the moveable contact 47 and the rate meter 15. With an appropriate setting, the maximum voltage change in the conductor 48 in any study is equal to the maximum change in any other study in which proper settings are made.

The conductor 48 energizes grid 49 of a triode 50. Anode 52 of the triode 50 is connected to the conductor 22. The conductor 22 conducts the output of the triode 50 to the power supply. The anode 52 is energized by a positive voltage supply at 53. Cathode 54 of the triode 50 is connected to ground through a potentiometer 55.

When the probe is placed over an area of maximum activity and the rate meter registers the maximum count rate, the output of the power supply is adjusted by varying the potentiometer 55. The conductor is connected to grid 56 of power supply control tube 57. Thus, the output of the power supply is controlled by varying the input to the grid 56 of the control tube 57.

The output of the control tube 57 is connected to grid 60 of the usual series connected power regulating triode 61. Thus, adjustment of the potentiometer 55 varies the output of the power regulating tube 61 and that output is registered on voltmeter 62.

With the described mechanism it will be seen that once the discriminated level of activity is obtained one light impulse will be emitted by the cathode ray tube 25 for each count detected by the probe and passed by the amplifier 12. The intensity of the emitted light pulse will vary with the count rate because the voltage on the focusing anode varies with the count rate. Thus, the intensity, or density, of an exposure on the film 40 in any given spot will reflect the count rate in a corresponding spot in the area studied. Since the probe and the cathode ray tube move together as a scan is conducted, the resultant film exposure is a graphic reproduction which outlines the distribution pattern and the concentration of radioactivity in an area under study.

*Method of Operation*

The method of operation of the device can best be understood if a specific example is employed in the description. The study of a human liver is an excellent example. In such a study a quantity of radioactive colloidal gold or other suitable radioactive substance is first administered intravenously. After an interval of about ten minutes the patient is positioned on a stretcher or other support beneath the probe. The probe is directed toward the approximate area of the liver.

After the probe is positioned, the rate meter time constant is set at its lowest level, ⅛ of a second in the disclosed arrangement. An audible sound producer, which is preferably supplied, is turned on. Next, the probe is shifted until the center of highest radioactive concentration is determined. The pitch of the audible sound and/or the indications of the rate meter may be used for locating this point of highest concentration. Once the point of maximal radioactivity has been determined, the indicated count on the rate meter is observed. To obtain a dependable average count-per-minute rate over a relatively long period of time, it is good practice to then adjust the time constant to a relatively high value such as 5 seconds and adjust the meter range to permit the maximum sensitivity within the capacity of the meter. By "maximum sensitivity" it is meant, for example, if the count-per-minute maximum is under 10,000, the 10,000 scale would be used. If it is in excess of 10,000, then one must use the next highest scale, for example, a 30,000 count per minute scale.

After the maximal count-per-minute rate has been determined, the minimal average count-per-minute rate should be determined in a similar fashion by, for example, moving the probe over the upper chest or lower abdomen. Having determined these two rates a percentage of 100% of the capacity of the selected rate scale is determined for both maximum and minimum rates. The difference between the maximum and minimum percentages is the count-per-minute range differential. The movable contact 47 of the variable amplifier is then set according to that range differential.

Next, the probe is positioned for the maximum count rate. The potentiometer 55 is then adjusted until the voltmeter 62 registers the desired maximum power supply output voltage. In the specific example given this desired maximum is 900 volts.

An appropriate time duration for the pulses emitted by the one shot multivibrator is selected and the one shot multivibrator is appropriately adjusted. This may be referred to as an adjustment in the "density," since it affects the density of the photographic image which will be obtained. Once these described adjustments have been made the study may be undertaken.

While the invention has been described with a great deal of detail it is believed that it essentially comprises a scintillation photorecording mechanism including a scintillation probe, a cathode ray tube, means connecting the output of the probe to the cathode and a power supply connected to the cathode ray tube accelerator with a power supply control means varying the voltage of the power supply in accordance with the count rate detected by the probe.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

In the claims:

1. In a scintillation recording mechanism the improvement comprises, a scintillation probe, a cathode ray tube having an electron emitting cathode and electron acceleration means, means connecting the probe to the cathode, a power supply connected to the acceleration means, and power supply control means connected to the probe and to the power supply to vary the power supplied to the acceleration means in proportion to the frequency of impulses emitted by the probe.

2. The device of claim 1 wherein the tube includes a grounded control grid.

3. In a scintillation recording mechanism the improvement comprises, a scintillation probe, a cathode ray tube having an electron emitting cathode and electron acceleration means, adjustable pulse emitting means for emitting one pulse of a predetermined and selected time duration for each signal pulse received, conductor means connecting the probe to the pulse emitting means to transmit signals from the probe to the pulse emitting means and connecting the pulse emitting means to said cathode to transmit emitted pulses from the pulse emitting means to the cathode, a power supply connected to the acceleration means, and power supply control means connected to the probe and to the power supply to vary the power supplied to the acceleration means in proportion to the frequency of impulses emitted by the probe.

4. In a scintillation recording mechanism the improvement comprises, a scintillation probe, a cathode ray tube having an electron emitting cathode and electron acceleration means, a discriminating amplifier connected to the probe, means connecting the amplifier to the cathode, a power supply connected to the accelerator means, and power supply control means connected to the amplifier and to the power supply to vary the voltage supplied to the accelerator means in proportion to the impulses emitted by the probe.

5. The device of claim 1 wherein said power supply control means comprises a rate meter and a variable gain amplifier.

6. The device of claim 1 wherein said tube has a grounded control grid and a focusing anode and wherein the focusing anode is connected to said power supply through a resistor.

7. A device for emitting signals suitable for measuring and graphically recording the distribution of a radioactive substance comprising, a scintillation probe, a discriminating amplifier electrically connected to the probe, a rate meter electrically connected to the discriminating amplifier and including means to adjust the output level to produce output voltages proportional to the activity measured by the probe and within a predetermined output voltage range, a variable amplifier electrically connected to the rate meter to produce an output voltage proportional to the rate meter output, a high voltage power supply electrically connected to the variable amplifier and responsive to the output of the latter, a cathode ray tube having an electron emitting cathode and an electron accelerating member, the accelerating member being connected to the power supply, a one shot multivibrator including means to adjust the duration of an output pulse, and said multivibrator being connected to the discriminating amplifier and to said cathode.

8. The device of claim 7 wherein the cathode ray tube has a control grid and wherein the control grid is grounded.

9. The device of claim 1 wherein said means connecting the probe to the cathode includes a multivibrator having means to adjust the duration of an output pulse.

10. The device of claim 4 wherein said means connecting the amplifier to the cathode includes a multivibrator having means to adjust the duration of an output pulse.

11. The device of claim 1 wherein the power supply control means includes a rate meter having independent means to control the range and to control the time constant.

12. The device of claim 4 wherein the power supply control means includes a rate meter having independent means to control the range and to control the time constant.

13. The device of claim 7 wherein the means included in the rate meter to adjust the output level includes independent means to control the range and to control the time constant.

14. A device for emitting signals for use by a photo recording mechanism comprising, a probe for emitting impulses in response to radioactivity detected, a discriminating amplifier connected to the probe for emitting impulses when the activity detected by the probe is above a predetermined minimum level; a light emitting tube having a cathode, an anode, and a means to control the brightness of an image produced on the anode; means connecting the discriminating amplifier to the tube cathode, other means connecting the discriminating amplifier to the brightness control means, and said other means including a rate meter having presettable means to independently adjust both the range and time constant prior to the conduction of a study and thereby utilize the full range of the brightness control means between said predetermined minimum level of activity and the maximum activity encountered during a given study.

15. The device of claim 14 wherein the means connecting the amplifier to the cathode includes a one shot multivibrator which emits one pulse of a predetermined duration and power for each impulse received.

16. The device of claim 15 wherein the time duration of the multivibrator pulse is presettable to obtain an adjustable predetermined pulse duration.

17. In a scintillation recording mechanism the improvement which comprises a scintillation probe to give signal pulses at a rate proportional to radioactivity detected, an electronic device having an energy emitting electrode and energy acceleration means, means connecting the probe to the energy emitting electrode, said electrode emitting an energy pulse for each signal pulse received from the scintillation probe, a power supply connected to the acceleration means, and power supply control means connected to the scintillation probe and to the power supply to vary the power supplied to the acceleration means in proportion to the frequency of signal pulses emitted by the scintillation probe so that energy pulses emitted by said electrode are increased in intensity by the acceleration means as the frequency of signal pulses emitted by the scintillation probe increases.

18. The device of claim 17 wherein the power supply control means includes a rate meter and a variable amplifier, said rate meter being connected to the scintillation probe and producing an output control voltage which varies in proportion to changes in the frequency of the signal pulses, said variable amplifier connected between said rate meter and said power supply and matching the maximum and minimum points of the output control voltage to maximum and minimum voltage points respectively of the power supply so that the maximum and minimum intensity of the energy pulses emitted by said electrode as controlled by the acceleration means corresponds precisely to the maximum and minimum points respectively of the rate meter output control voltage.

19. The device of claim 17 wherein a one-shot multivibrator is connected between said scintillation probe and said energy emitting electrode and produces an electrical pulse for each signal pulse received from said scintillation probe, said one shot multivibrator having means to adjust the duration of said electrical pulse.

20. The device of claim 17 wherein a discriminating amplifier is connected to said scintillation probe and passes only those signal pulses which are between a predetermined range of amplitudes.

21. The device of claim 20 wherein the power supply control means includes a rate meter and a variable amplifier, said rate meter being connected to the discriminating amplifier and producing and output control voltage which varies in proportion to changes in the frequency of the signal pulses, said variable amplifier connected between said rate meter and said power supply and matching the maximum and minimum points of the output control voltage to the maximum and minimum voltage points respectively of the power supply so that the maximum and minimum intensity of the energy pulses emitted by said electrode as controlled by the acceleration means corresponds precisely to the maximum and minimum points respectively of the rate meter output control voltage.

22. The device of claim 21 wherein a one-shot multivibrator is connected between said discriminating amplifier and said energy emitting electrode and produces an electrical pulse for each signal pulse received from said discriminating amplifier, said one shot multivibrator having means to adjust the duration of said electrical pulse.

23. In a scintillation recording mechanism the improvement comprising:
  (a) a scintillation responsive means to give signal pulses at a rate proportional to radioactivity detected;
  (b) an electronic device having an electron emitting means and an electron acceleration means;
  (c) means energizing said electron emitting means;
  (d) a power supply connected to the acceleration means; and
  (e) power supply control means connected to the scintillation responsive means and to the power supply to vary the power supplied to the acceleration means in proportion to the frequency of the pulses emitted by said scintillation responsive means.

24. The combination of claim 23 wherein said electronic device is a cathode ray tube.

25. The combination of claim 23 wherein the power supply control means includes a ratemeter producing an output control voltage proportional to the frequency of the pulses emitted by the scintillation responsive means and having means to adjust the level of the output voltage within a predetermined voltage range.

26. The combination of claim 23 wherein the power supply control means includes a ratemeter producing an output control voltage proportional to the frequency of the pulses emitted by the scintillation responsive means and having means to adjust its voltage range and its time constant.

27. In a scintillation recording mechanism the improvement comprising:
  (a) a scintillation probe having an output for producing signal pulses at a rate proportional to radio activity detected;
  (b) a discriminating amplifier having an input connected to the output of the scintillation probe and an output for producing signal pulses between a predetermine range of amplitudes;
  (c) a ratemeter having an input connected to the output of the discriminating amplifier and an output for producing an output control voltage which varies in proportion to the frequency of the signal pulses applied to its input;
  (d) an electronic device having an electron emitting electrode and an electron acceleration means;
  (e) means energizing said electron emitting electrode to cause the emission of electrons;
  (f) a power supply connected to the acceleration means; and
  (g) means connecting the output of said ratemeter to said power supply so that the power supplied to said acceleration means varies in proportion to the output control voltage of the ratemeter.

28. In a scintillation recording mechanism the improvement comprising:
  (a) a scintillation probe to give signal pulses at a rate proportional to radioactivity detected;
  (b) an electronic device having an electron emitting electrode and an electron acceleration means;
  (c) means energizing said electron emitting electrode to cause the emission of electrons;
  (d) a ratemeter connected to the scintillation probe and producing an output control voltage which varies in proportion to the frequency of the signal pulses;
  (e) a power supply connected to the acceleration means; and,
  (f) a variable amplifier connected between said ratemeter and said power supply and matching the maximum and minimum points of the output control voltage to the maximum and minimum points respectively of the power supply so that the maximum and minimum intensity of the electron emission by said electron emitting electrode as controlled by the acceleration means corresponds to the maximum and minimum points respectively of the ratemeter output control voltage.

29. In a scintillation recording mechanism, the improvement which comprises:
  (a) a scintillation detection means to provide signal pulses at a rate proportional to radioactivity detected;
  (b) a light source;
  (c) circuit means connecting the light source to the scintillation means to cause said light source to produce a light pulse after receiving a predetermined number of signal pulses from the scintillation means; and,
  (d) control means connected to the scintillation detection means and to the light source to vary the intensity of light pulses emitted by the light source in proportion to the frequency of signal pulses emitted by the scintillation means whereby the light pulses emitted by the light source vary in intensity and in frequency as the frequency of the signal pulses emitted by the scintillation means varies.

References Cited by the Examiner
UNITED STATES PATENTS

| | | | |
|---|---|---|---|
| 2,769,094 | 10/56 | Linlor | 250—71.5 |
| 2,922,885 | 1/60 | Tittle | 250—71.5 |

OTHER REFERENCES

"Simple Recording Gamma-Ray Spectrometer," by W. H. Venable, Jr., from Nucleonics, vol. 15, No. 7, July 1957, pp. 84, 85 and 86.

"Techniques for the Visulization of Internal Organs by an Automatic Radioistope Scanning System," by W. J. MacIntyre et al., from International Journal of Applied Radiation and Isotopes, 1958, vol. 3, pp. 193 to 206, published by Pergamon Press Ltd., London, England.

RALPH G. NILSON, *Primary Examiner.*

ARCHIE R. BORCHELT, *Examiner.*